Nov. 11, 1930. FURNACE DOOR Re. 17,864
Original Filed July 29, 1927
Fig. I.
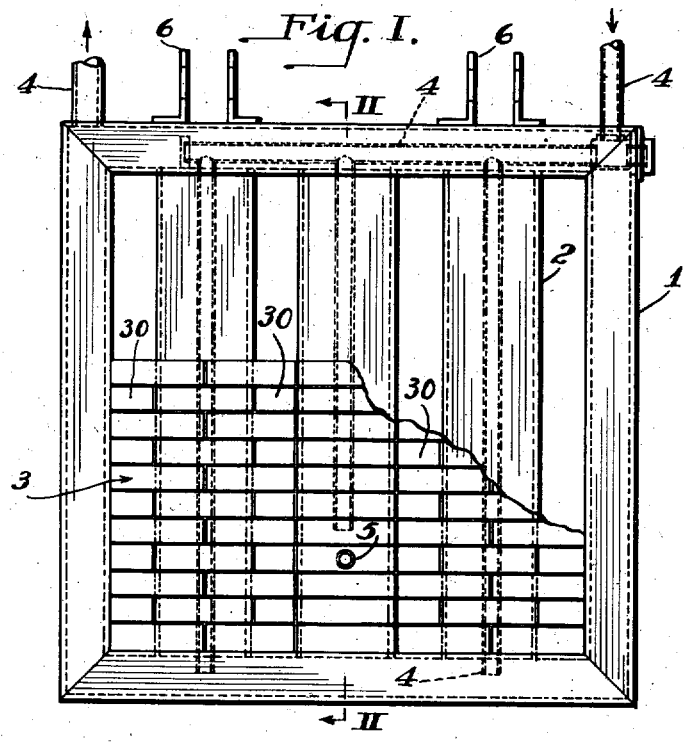
Fig. II.
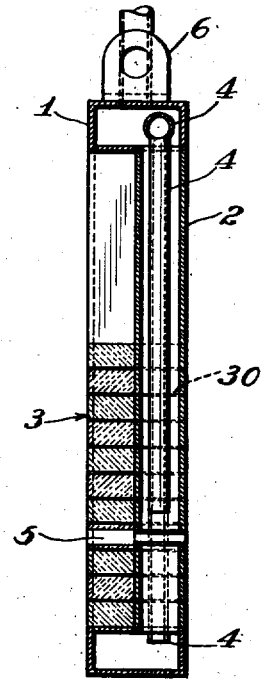
INVENTOR
Edward Williams
by Christy and Christy
his attorneys Reissued Nov. 11, 1930

Re. 17,864

UNITED STATES PATENT OFFICE

EDWARD WILLIAMS, OF CHARLEROI, PENNSYLVANIA, ASSIGNOR, BY MESNE ASSIGNMENTS, TO BLAW-KNOX COMPANY, OF PITTSBURGH, PENNSYLVANIA, A CORPORATION OF NEW JERSEY

FURNACE DOOR

Original No. 1,690,606, dated November 6, 1928, Serial No. 209,274, filed July 29, 1927. Application for reissue filed May 23, 1929. Serial No. 365,585.

It is the object of this invention to provide a metal framed, refractory faced, water cooled furnace door, simple in structure, easily fabricated, adequate, and durable.

A door embodying my invention is illustrated in the accompanying drawings. Fig. 1 is a diagrammatic view, showing the door in front elevation, but with part of the refractory face broken away. Fig. 2 is a view in vertical section, on the plane II—II, Fig. 1.

The door of a furnace in which very high temperatures are maintained,—temperatures exceeding the melting point of iron,—the door of an open-hearth furnace, for instance, must in that portion at least which is exposed to the atmosphere of the furnace chamber, be formed of highly refractory material. And, practically considered, the material must be firebrick or material of that class to which the word "refractory" in more specific sense has come to be applied as its designation. Such material, being of relatively brittle and friable nature, lacking tensile strength and hardness, must, in order to constitute a movable and durable door, be carried in a frame, and the frame must, under practical limitations, be of metal. And the frame of metal must, in order to endure the conditions of service, be made hollow and be cooled by water or equivalent substance circulating within it.

The frame of my door I make of rolled steel pipe, and the frame consists of a peripheral portion 1, ordinarily of rectangular contour, and of intermediate transverse portions, in the form of one or more bars 2, extending across the space defined by the peripheral portion and at the ends opening into the pipe sections which constitute the peripheral portion. The tubular members forming the door are all integrally connected and form a continuous water space. The transverse bars are less in thickness, transversely through the door, than is the peripheral portion of the frame, and they are arranged on the outer side, as will be seen on considering Fig. 2, so that the conductor walls on one side of the structure extend in common plane and on the other side form a re-entrant brick-receiving space. Such space may be filled solid with refractory material 3, and the inner face of the finished door may within the peripheral portion 1 of the frame present a continuous face of refractory material.

The transverse bars 2 are spaced apart one from another and from the lengths of pipe of which the peripheral portion 1 is formed, to the end that the refractory body which faces the door on the inside may extend into and fill the spaces, and that thus a more securely integrated and more durable door may be produced.

The refractory body 3 will ordinarily be built of bricks of standard size, 9 inches x 4½ on the face. Accordingly I preferably form my door of rectangular rolled steel pipe of corresponding size, approximately 9 inches x 4½. The rectangular periphery 1 of the door frame is formed of lengths of pipe set with the greater dimension (9 inches) extending in the direction of the thickness of the door. The lengths of pipe which form the transverse bars 2 are set with the smaller dimension (4½ inches) extending in the direction of the thickness of the door, and the greater in the direction of the lateral extent of the door. The marginal portion extends transversely beyond the intermediate portion by a space interval equal, with tolerance, to the width of a standard brick. The spaces at which the transverse bars stand apart from one another and from the lengths of pipe which constitute the sides of the door frame are, with proper tolerance, equal to the breadth of a brick (4½ inches). The drawings show an integrated frame made up of four peripheral lengths of pipe and three intermediate and transverse lengths. In the peripheral lengths openings are cut to receive the ends of the transverse lengths, and the components are welded along all lines of meeting.

The body of refractory material is built into the frame, and at proper intervals particular bricks 30 are laid extending lengthwise throughout the overall thickness of the door (9 inches) and into the spaces between the pipes. Thus the refractory face of the door is bonded to the metal frame. All the spaces formed by transverse members 2 will preferably be filled with masonry.

By reason of the fact that the brickwork extends into the spaces between the bars or pipe 2, it is securely held in place and is very effectively cooled. By reason of the high temperature to which furnace doors are subjected, the life of the brickwork lining becomes an important item, and the superior cooling afforded by my construction constitutes an important advantage of this invention.

Circulation pipes are indicated at 4. The use of such pipes is familiar. Any preferred arrangement of them may be adopted. With the matter of circulation in mind it will be remarked that the door preferably stands with the transverse members 2 is vertical position.

The usual peep hole 5 may be formed through one of the members 2 and continued through the facing 3.

The door is provided with suspension lugs 6, as is usual.

I have illustrated and described a present preferred form of the invention. It will be understood, however, that it is not limited to the form shown but may be otherwise embodied within the scope of the following claims.

I claim as my invention:

1. A supporting grid for brickwork which with the supported brickwork constitutes a furnace door, such grid being formed of lengths of metallic conductor for liquid, fitted together, the structure including a marginal portion and an intermediate portion extending transversely between opposite members of the marginal portion, the marginal portion extending transversely beyond the intermediate portion by a space interval equal, with tolerance, to the width of a standard brick, and the grid spaces being equal, with tolerance, to the width of a standard brick.

2. A supporting grid for brickwork which with the supported brickwork constitutes a furnace door, such grid being formed of lengths of metallic conductor for liquid of cross-sectional dimensions corresponding to the length and width of a standard brick, the structure including a marginal portion in which the conductor is arranged with its greater dimension transverse to the general extent of the structure, and an intermediate portion extending transversely between opposite members of the marginal portion, the conductor in such intermediate portion being arranged with its less dimension transverse to the general extent of the structure, the conductor walls on one side of the structure extending in common plane and on the other side forming a re-entrant brick-receiving space of a depth equal, with tolerance, to the width of a standard brick, and the grid spaces having a width equal, with tolerance, to the width of a standard brick.

3. A wrought metal furnace door comprising a hollow metal rim, a tube extending across the rim and opening thereinto, and means whereby cooling water may be circulated through the door.

4. A wrought metal furnace door comprising a hollow metal rim, a tube of less thickness than the rim extending across the rim and opening thereinto, and means whereby cooling water may be circulated through the door.

5. A furnace door comprising a hollow metal rim, a plurality of spaced tubes extending across the rim and opening thereinto, and means whereby cooling water may be circulated through the door.

6. A furnace door comprising a hollow metal rim, a vertically extending tube extending across the rim and opening thereinto, and means whereby cooling water may be circulated through the door.

7. A furnace door comprising a hollow rim, a tube extending across the rim and opening thereinto, the tube being of substantially half the thickness of the rim, and having its side wall spaced from the rim a distance substantially equal to the thickness of said tube, and means whereby cooling water may be circulated through the door.

8. A furnace door comprising a hollow metal rim, vertically extending tubes extending across the rim and opening thereinto, and a supply pipe for cooling water projecting into the tubes.

9. A furnace door comprising a hollow metal rim, tubes of less thickness than the rim extending from one margin of the rim to an opposite margin thereof and opening into the rim, means for circulating water through the rim and the tubes, and brickwork lying within the rim between the planes of the front and rear faces thereof, the brickwork forming a substantially continuous facing covering those faces of the tubes which are closest to the furnace when the door is in service, the brickwork extending rearwardly between the tubes, whereby upon burning away of the brickwork facing to a point where such burning is substantially limited by the cooling effect of the tubes, such extending portions hold the thinned facing in place.

10. A supporting grid for brickwork which with the supported brickwork constitutes a furnace door, such grid being formed of lengths of metallic conductor for liquid, the structure including a marginal portion in which the conductor is arranged with its greater dimension transverse to the general extent of the structure, and an intermediate portion extending transversely between opposite members of the marginal portion, the conductor in such intermediate portion being arranged with its less dimension transverse to the general extent of the structure, the conductor walls on one side of the structure extending in common plane and on the other side forming a re-entrant brick-receiving space.

11. A wrought metal furnace door having a closed top and comprising a hollow rim with spaced tubular members extending across the rim and forming a continuous water space therewith.

In testimony whereof I have hereunto set my hand.

EDWARD WILLIAMS.